United States Patent
Imaoka et al.

(10) Patent No.: US 10,146,113 B2
(45) Date of Patent: Dec. 4, 2018

(54) HEAT TRANSPORT DEVICE AND PROJECTOR

(71) Applicant: SEIKO EPSON CORPORATION, Tokyo (JP)

(72) Inventors: Norio Imaoka, Takamori-Machi (JP); Katsuya Shimizu, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/837,002

(22) Filed: Dec. 11, 2017

(65) Prior Publication Data
US 2018/0180974 A1 Jun. 28, 2018

(30) Foreign Application Priority Data
Dec. 28, 2016 (JP) ................. 2016-255076

(51) Int. Cl.
| | |
|---|---|
| G03B 21/14 | (2006.01) |
| H04N 9/31 | (2006.01) |
| F28D 15/04 | (2006.01) |
| G03B 21/16 | (2006.01) |
| F28D 15/06 | (2006.01) |

(52) U.S. Cl.
CPC ........... *G03B 21/16* (2013.01); *F28D 15/043* (2013.01); *F28D 15/046* (2013.01); *F28D 15/06* (2013.01); *H04N 9/3144* (2013.01)

(58) Field of Classification Search
CPC .... G03B 21/16; H04N 9/3144; F28D 15/043; F28D 15/046; F28D 15/0266
USPC .............................. 165/302; 353/54
See application file for complete search history.

(56) References Cited

U.S. PATENT DOCUMENTS

| | | | | |
|---|---|---|---|---|
| 2014/0137581 A1* | 5/2014 | Cho | ...................... | F25B 39/028 62/119 |
| 2015/0198869 A1* | 7/2015 | Kuriaki | ................... | H01J 17/28 353/31 |

FOREIGN PATENT DOCUMENTS

JP        2001-066080 A       3/2001

* cited by examiner

*Primary Examiner* — Ryan Howard
(74) *Attorney, Agent, or Firm* — Oliff PLC

(57) ABSTRACT

A heat transport device having a hydraulic fluid includes: an evaporating unit configured to receive heat from outside and gasify the hydraulic fluid into a gas; a condensing unit configured to liquefy the gas into the hydraulic fluid; and first and second fluid pipes respectively connected to the evaporating unit. The first and second fluid pipes forming an annular flow path with the evaporating unit and the condensing unit. The evaporating unit includes a first porous body which is permeated with the hydraulic fluid by capillary force, and a heat receiving unit configured to receive heat from outside. The heat receiving unit has an accommodation area where the first porous body moves in a first direction. The first fluid pipe is connected to one end side in the first direction of the accommodation area. The second fluid pipe is connected to the other end side of the accommodation area.

18 Claims, 6 Drawing Sheets

HEAT TRANSPORT DEVICE AND PROJECTOR

BACKGROUND

1. Technical Field

The present invention relates to a heat transport device and a projector.

2. Related Art

According to the related art, a projector is known which has a light source device and a light modulation device and which is installed on a ceiling or the like, in a position of being placed on a desk or the like, or in a position vertically inverted from the upright position (suspended position) and projects an image on a projection surface such as a screen. Recently, as a projector that can project a brighter image over a long period is demanded a projector having a light source device using a light emitting element such as a semiconductor laser is known. This light source device significantly generates heat when emitting light and therefore needs efficient cooling. Thus, as a device for efficiently cooling this light source device, a device utilizing a hydraulic fluid is conceivable (see, for example, JP-A-2001-66080).

In the device (loop heat pipe) disclosed in JP-A-2001-66080, a pipe with a hydraulic fluid sealed therein is connected, and a condenser, a reservoir pipe, and an evaporator are installed in order from above in the direction of gravity. The condenser has heat exchanger fins. The reservoir pipe is embedded in the heat exchanger fins of the condenser. The evaporator has a hydraulic fluid outlet installed above a liquid hydraulic fluid inlet.

However, in the device disclosed in JP-A-2001-66080, the positional relationship in the vertical direction of the respective components is limited because of the operation of cooling a cooling target. Therefore, if the components are set in a positional relationship for an operation that enables efficient cooling when the projector is in one of the upright position and the suspended position, an operation for efficient cooling when the projector is in the other position is difficult and there is a risk of being unable to efficiently cool the light source device.

SUMMARY

An advantage of some aspects of the invention is to solve at least a part of the problems described above, and the invention can be implemented as the following forms or application examples.

A heat transport device according to this application example is a heat transport device having a hydraulic fluid and including: an evaporating unit configured to receive heat from outside and gasify the hydraulic fluid into a gas; a condensing unit configured to liquefy the gas gasified in the evaporating unit into the hydraulic fluid; and a first fluid pipe and a second fluid pipe respectively connected to the evaporating unit and the condensing unit, the first and second fluid pipes forming an annular flow path with the evaporating unit and the condensing unit. The evaporating unit includes a first porous body which is permeated with the hydraulic fluid by capillary force, and a heat receiving unit configured to receive heat from outside, the heat receiving unit having an accommodation area where the first porous body moves in a first direction. The first fluid pipe is connected to one end side in the first direction of the accommodation area. The second fluid pipe is connected to the other end side in the first direction of the accommodation area.

With this configuration, a loop heat pipe system using the hydraulic fluid is formed by the evaporating unit, the first fluid pipe, the condensing unit, and the second fluid pipe. Thus, with the gasification and liquefaction of the hydraulic fluid in this system, a circulation system which transfers to the condensing unit the heat of the heat generating member connected to the heat receiving unit and thus cools the heat generating member can be formed.

The evaporating unit is configured in such a way that the first porous body can move in the first direction in the accommodation area of the heat receiving unit. The first fluid pipe and the second fluid pipe are connected to the accommodation area at the positions described above. Thus, it is possible to cool the heat generating member connected to the heat receiving unit, when the heat transport device is in a first position where one end side in the first direction of the accommodation area is situated above the other end side, and in a second position which is vertically inverted from the first position. That is, as the heat receiving unit receives heat, the heat is transmitted to the first porous body, and the hydraulic fluid permeating the first porous body is gasified by this heat. The resulting gas flows to the condensing unit via the first fluid pipe from the space (upper space) above the first porous body in the accommodation area when the heat transport device is in the first position, and the gas flows to the condensing unit via the second fluid pipe from the upper space when the heat transport device is in the second position. The hydraulic fluid liquefied in the condensing unit flows to the evaporating unit via the second fluid pipe when the heat transport device is in the first position, and the hydraulic fluid flows to the evaporating unit via the first fluid pipe when the heat transport device is in the second position. The first fluid pipe and the second fluid pipe function as gas pipes through which the gas circulates and as liquid pipes through which the hydraulic fluid circulates, corresponding to the first position and the second position, respectively.

Thus, it is possible to provide a heat transport device which transfers the heat of the heat generating member connected to the heat receiving unit and thus cools the heat generating member, in the first position and the second position.

In the heat transport device according to the application example, it is preferable that the heat receiving unit has a wall part which forms the accommodation area, and that the wall part has an inner surface which is in contact with the first porous body and along the first direction.

With this configuration, the first porous body moves along the inner surface of the wall part even when the heat transport device shifts from the first position to the second position or from the second position to the first position. Thus, the first porous body can receive via the wall part the heat of the heat generating member connected to the wall part, similarly in the first position and the second position. Thus, in the heat transport device, the hydraulic fluid permeating the first porous body evaporates similarly in the first position and the second position. Therefore, the heat of the heat generating member connected to the wall part can be transferred similarly to the condensing unit, and the heat generating member can be cooled.

In the heat transport device according to the application example, it is preferable that the first porous body has an opposite part which forms a side facing the inner surface of the wall part, and that a groove extending along the first direction is formed on at least one of the inner surface and the opposite part.

With this configuration, the gas resulting from the evaporation of the hydraulic fluid permeating the first porous body passes through the groove when the heat transport device is in the first position and the second position. Therefore, it is possible to efficiently transfer the heat in the system.

In the heat transport device according to the application example, it is preferable that a second porous body which is permeated with the hydraulic fluid by capillary force is provided on an inner surface of the first fluid pipe and the second fluid pipe.

If the heat transport device is shifted from the first position to the second position or from the second position to the first position and one of the first fluid pipe and the second fluid pipe is changed to the state of functioning as a gas pipe from the state of functioning as a liquid pipe, there is a risk that the hydraulic fluid may be left in the gas pipe.

With this configuration, the second porous body is provided on the inner surface of the first fluid pipe and the second fluid pipe. Therefore, even if the hydraulic fluid is left in the pipes, the second porous body is permeated with this hydraulic fluid. Thus, it is possible to prevent the hydraulic fluid from blocking the inside of the gas pipe, and to secure a space in which the gas can circulate. Therefore, it is possible to provide a heat transport device that can quickly transfer heat even if its position is changed.

In the heat transport device according to the application example, it is preferable that the evaporating unit has a plurality of tank parts configured to store the hydraulic fluid, that the plurality of tank parts includes a first tank part arranged between the accommodation area and the first fluid pipe and a second tank part arranged between the accommodation area and the second fluid pipe, that the second tank part stores the hydraulic fluid when the heat transport device is in a first position where the one end side is vertically above the other end side, and that the first tank part stores the hydraulic fluid when the heat transport device is in a second position where the other end side is vertically above the one end side.

With this configuration, the heat transport device has the tank parts. Therefore, it is possible to seal, in the flow path, the hydraulic fluid contributing to heat transfer without strictly controlling the amount of the hydraulic fluid. This enables simplification of the manufacturing of the heat transport device.

Also, even if the amount of the hydraulic fluid contributing to heat transfer inside the heat transport device is reduced, the hydraulic fluid is supplied from the second tank part when the heat transport device is in the first position and from the first tank part when the heat transport device is in the second position. Therefore, it is possible to provide a heat transport device which securely transfers heat inside the system in the first position and the second position.

In the heat transport device according to the application example, it is also preferable that the first porous body moves along the first direction according to a position of the heat transport device.

In the heat transport device according to the application example, it is also preferable that the first fluid pipe and the second fluid pipe are connected to the evaporating unit, shifted from each other in a vertical direction.

In the heat transport device according to the application example, it is also preferable that the first fluid pipe is configured to circulate one of the gas and the hydraulic fluid, that the second fluid pipe is configured to circulate the other of the gas and the hydraulic fluid, and that the first fluid pipe and the second fluid pipe are connected to the evaporating unit in such a way that one fluid pipe through which the gas circulates, of the first fluid pipe and the second fluid pipe, is arranged vertically above the other fluid pipe through which the hydraulic fluid circulates.

In the heat transport device according to the application example, it is also preferable that the first fluid pipe is configured to circulate one of the gas and the hydraulic fluid, that the second fluid pipe is configured to circulate the other of the gas and the hydraulic fluid, and that the hydraulic fluid and the gas are switched between the first fluid pipe and the second fluid pipe according to a position of the heat transport device.

A projector according to this application example includes: a light source device; a light modulation device configured to modulate light emitted from the light source device; a projection device configured to project the light modulated by the light modulation device; and the heat transport device according to one of the above configurations.

With this configuration, the projector has the foregoing heat transport device. Therefore, it is possible, for example, to efficiently transfer the heat of the light source device and cool the light source device by the heat transport device in the first position and the second position. Thus, it is possible to provide a projector which stably projects a bright image over a long period, in the first position and the second position.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a projector according to this embodiment will be described with reference to the drawings.

The projector in this embodiment modulates light emitted from a light source, according to image information, and projects the modulated light in an enlarged manner on a projection surface such as a screen. The projector in the embodiment is configured to be able to project an image in an upright position where the projector is placed on a desk or the like (first position) and in a suspended position where the projector is installed on a ceiling or the like (second position). In the illustrations below, the dimensions and proportion of each component are different from its actual dimensions and proportion where appropriate, in order to show each component in a large enough size to be recognized in the illustrations.

Main Configuration of Projector

Figure 1:
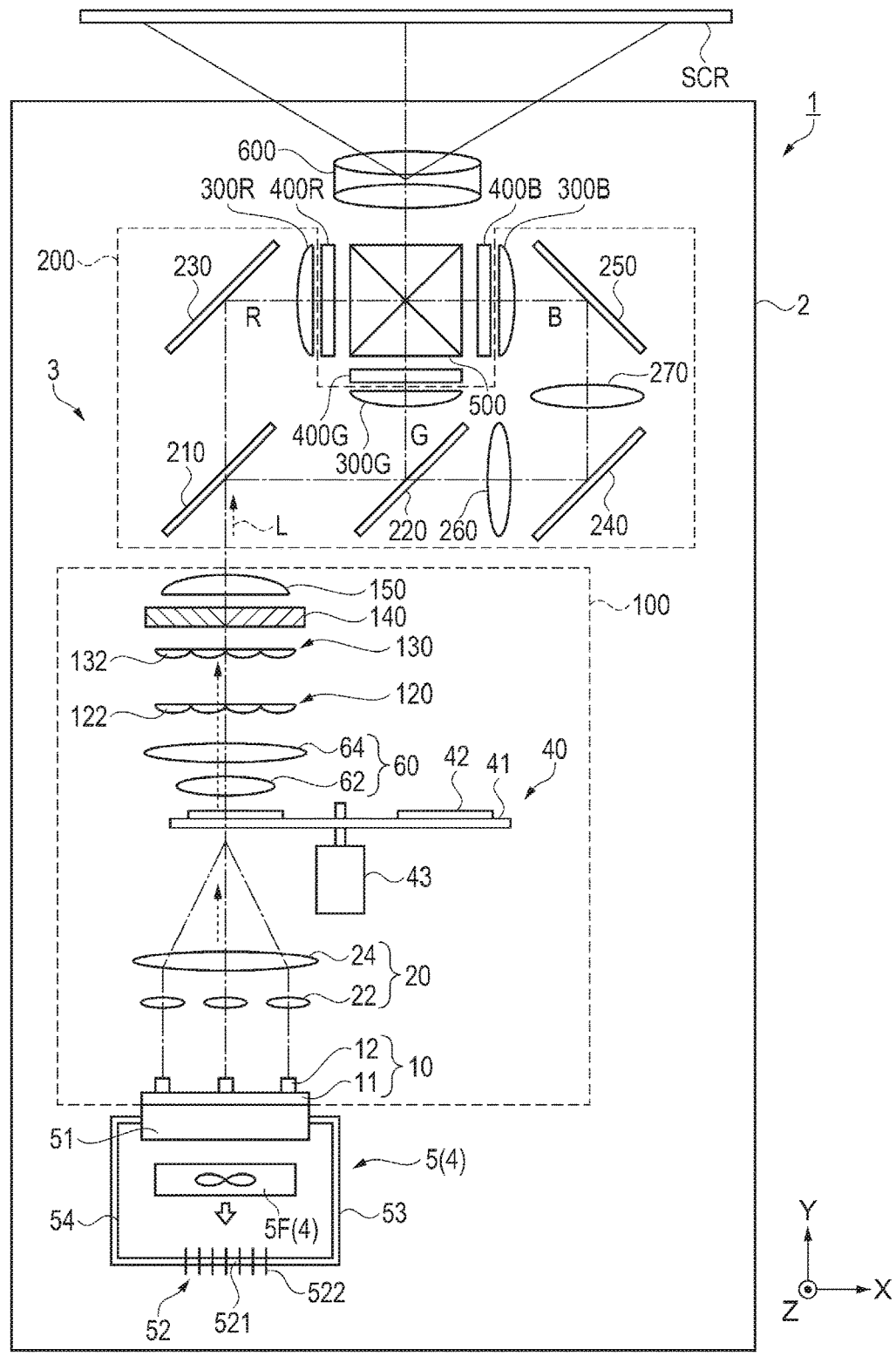
FIG. 1 is a schematic view showing the main configuration of a projector according to a first embodiment.

FIG. 1 is a schematic view showing the main configuration of a projector 1 in the embodiment.

As shown in FIG. 1, the projector 1 includes an exterior casing 2 forming the exterior, an optical unit 3 having a light source device 10, a cooling device 4, and a control unit, a power supply device and the like, not illustrated.

The optical unit 3 has an illumination device 100, a color separation system 200, liquid crystal light valves 400R, 400G, 400B as light modulation devices, a cross dichroic prism 500 as a color combining device, and a projection device 600, as shown in FIG. 1.

The illumination device 100 has the light source device 10, a condensing system 20, a wavelength conversion device 40 having a fluorescent body 42, a collimating system 60, lens arrays 120, 130, a polarization conversion element 140, and a superimposing lens 150.

The light source device 10 has a base member 11 and a plurality of light emitting elements 12 arranged on the base member 11.

The base member 11 is formed of a material such as copper or Kovar.

Each of the light emitting elements 12 is a semiconductor laser and emits blue light (for example, light with a light emission intensity peak of approximately 445 nm) to excite the fluorescent body 42.

The condensing system 20 has a plurality of first lenses 22 arranged on the light exiting side of the respective light emitting elements 12, and a second lens 24 on which the light passed through the plurality of first lenses 22 becomes incident. The condensing system 20 condenses the light emitted from the light source device 10 onto the fluorescent body 42.

The wavelength conversion device 40 has a disc 41, the fluorescent body 42 provided in a circumferential direction on the disc 41, and a motor 43 which causes the disc 41 to rotate.

The disc 41 is formed of a member which transmits the light emitted from the light emitting elements 12, for example, quartz glass, crystal, sapphire or the like.

The fluorescent body 42 is provided on the side opposite to the condensing system 20, of the disc 41, and is provided at the focal position of the light condensed by the condensing system 20. The fluorescent body 42 transmits a part of the light (blue light) emitted from the light source device 10, absorbs the rest of the light, and emits yellow light (for example, light with a light emission intensity peak of approximately 550 nm). The light emitted from the fluorescent body 42 is white light formed by the blue light and the yellow light combined together.

The motor 43 is configured to cause the disc 41 to rotate so that the light emitted from the light source device 10 will not be cast continuously at the same position on the fluorescent body 42. This restrains deterioration of the fluorescent body 42 and the disc 41.

The collimating system 60 has a first lens 62 which restrains the light emitted from the fluorescent body 42 from spreading, and a second lens 64 which parallelizes the light incident thereon from the first lens 62. Thus, the collimating system 60 as a whole parallelizes the light emitted from the fluorescent body 42.

The lens array 120 has a configuration in which small lenses 122 are arranged in the form of a matrix. The lens array 120 splits the light emitted from the collimating system 60 into a plurality of partial lights. The lens array 130 has small lenses 132 configured similarly to those of the lens array 120. The lens array 130, along with the superimposing lens 150, substantially superimposes the plurality of partial lights onto the liquid crystal light valves 400R, 400G, 400B. The polarization conversion element 140 converts the non-polarized light emitted from the lens array 130 to linearly polarized light that can be used in the liquid crystal light valves 400R, 400G, 400B.

The color separation system 200 has dichroic mirrors 210, 220, mirrors 230, 240, 250, field lenses 300R, 300G, 300B, and relay lenses 260, 270. The color separation system 200 separates light L emitted from the illumination device 100 into ref light (R light), green light (G light), and blue light (B light), and guides these lights to the liquid crystal light valves 400R, 400G, 400B for the respective colors.

The liquid crystal light valves 400R, 400G, 400B are, for example, transmission-type liquid crystal light valves and are connected to a control unit via a cable, not illustrated. The liquid crystal light valves 400R, 400G, 400B modulate the respective color lights emitted from the color separation system 200, based on an image signal supplied thereto, and form image lights of the respective colors.

The cross dichroic prism 500 is substantially square as viewed in a plan view, with four right-angled prisms joined together. A dielectric multilayer film is formed on the interface where the right-angled prisms are joined together. The cross dichroic prism 500 reflects the R light and the B light modulated by the liquid crystal light valves 400R, 400B, transmits the G light modulated by the liquid crystal light valve 400G, and combines the image lights of the three colors.

The projection device 600 includes a plurality of lenses (not illustrated) and projects the light combined by the cross dichroic prism 500 onto a projection surface SCR in an enlarged manner.

The optical unit 3 in this embodiment is configured in such a way that the direction of the light emitted from the light source device 10 and the direction of the light emitted from the projection device 600 are the same. In the description below, for the sake of convenience of the description, the direction of the light emitted from the projection device 600 is referred to as a +Y direction (front), the upper side above the projector 1 is referred to as a +Z direction, and the right-hand side of the projector 1 as viewed from the back side is referred to as a +X direction.

The cooling device 4 has a heat transport device 5 having a hydraulic fluid, and a blower fan 5F, as shown in FIG. 1, and cools the light source device 10.

The heat transport device 5 has an evaporating unit 51, a condensing unit 52, and a first fluid pipe 53 and a second fluid pipe 54 connected to the evaporating unit 51 and the condensing unit 52, respectively, and forming an annular flow path with the evaporating unit 51 and the condensing unit 52. The heat transport device 5 thus forms a so-called loop heat pipe system.

In the heat transport device 5, the evaporating unit 51 is connected to the light source device 10, and the heat of the light source device 10 is thus transferred to the condensing unit 52. As will be described in detail later, the evaporating unit 51 has a container 510 as a heat receiving unit, and a first porous body 7 movable within the container 510 (see FIG. 2 for these components). The evaporating unit 51 is configured to efficiently transfer the heat of the light source device 10 to the condensing unit 52 when the projector 1 is in the upright position and in the suspended position.

The blower fan 5F blows cooling air to the condensing unit 52 and facilitates radiation of the heat transmitted from the evaporating unit 51 to the condensing unit 52.

Configuration of Heat Transport Device

Details of the heat transport device 5 will now be described.

The heat transport device 5 has the hydraulic fluid, the evaporating unit 51, the condensing unit 52, the first fluid pipe 53, and the second fluid pipe 54, as described above (see FIG. 1).

Water or the like is used as the hydraulic fluid. This hydraulic fluid is sealed in the annular flow path in the heat transport device 5 after this flow path is degassed.

The evaporating unit 51 receives heat from outside, that is, the heat of the light source device 10, and gasifies the hydraulic fluid.

Figure 2:
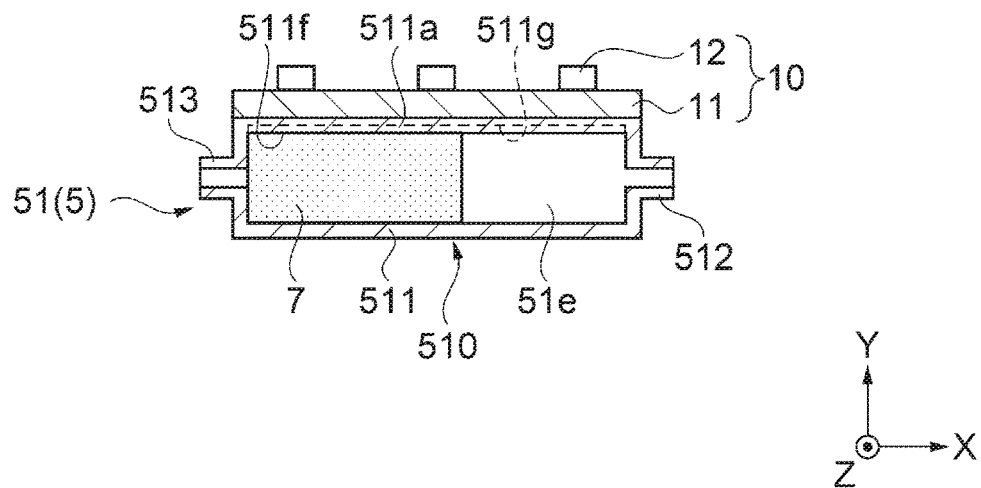
FIG. 2 is a cross-sectional view schematically showing a light source device and an evaporating unit in the first embodiment.
Figure 3:
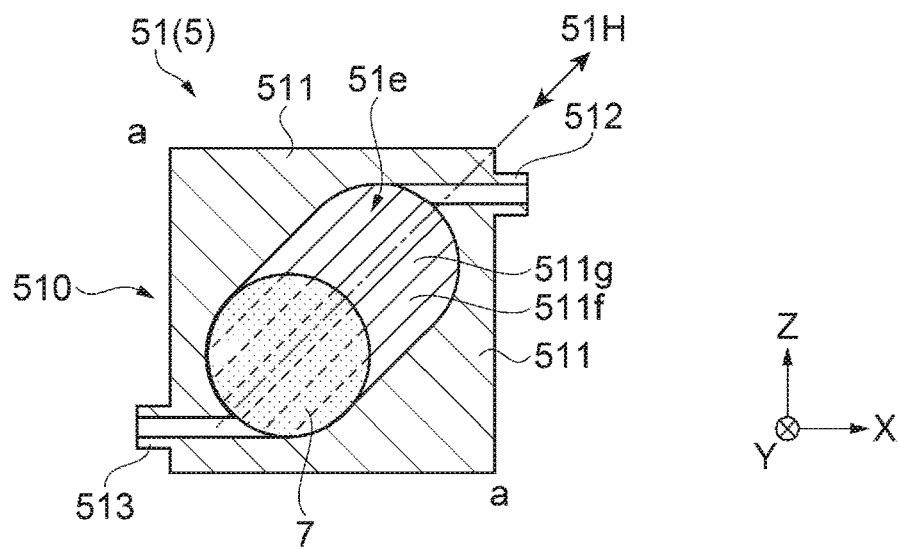
FIG. 3 is a cross-sectional view schematically showing the evaporating unit in the first embodiment.

FIG. 2 is a cross-sectional view schematically showing the light source device 10 and the evaporating unit 51, as viewed from above (+Z side). FIG. 3 is a cross-sectional view schematically showing the evaporating unit 51, as viewed from the back side (−Y side).

The evaporating unit 51 has a container 510 and a first porous body 7 accommodated in the container 510, as shown in FIGS. 2 and 3.

The container 510 is formed of, for example, copper or aluminum, or an alloy containing these materials. The container 510 includes a main body part 511 in the shape of a rectangular parallelepiped, and a first connecting part 512 and a second connecting part 513 which are in a tubular shape protruding from the left and right sides of the main body part 511.

The main body part 511 has a wall part 511a connected to the base member 11 of the light source device 10, and an accommodation area 51e where the first porous body 7 can move is provided on the inner side of the wall part 511a, as shown in FIG. 2. The wall part 511a has an inner surface 511f along a first direction 51H, described later, and a plurality of grooves 511g extending along the first direction 51H is provided on the inner surface 511f, as shown in FIG. 3.

The accommodation area 51e is formed, as viewed in a plan view, in the shape of a track having an arcuate shape on both sides of a direction (first direction 51H) tilting to the +X side with respect to an up-down direction (Z direction) as viewed from the −Y side, as shown in FIG. 3.

That is, when in the upright position, one end side in the first direction 51H (end side on the +Z side, referred to as a "first end side") of the accommodation area 51e is above the other end side (end side on the −Z side, referred to as a "second end side"). When in the suspended position, the second end side is above the first end side.

The first connecting part 512 is formed in such a way that its inside communicates with the first end side of the accommodation area 51e, and the first fluid pipe 53 (see FIG. 1) is connected to the first connecting part 512. That is, the first fluid pipe 53 is connected to the first end side of the accommodation area 51e via the first connecting part 512.

The second connecting part 513 is formed in such a way that its inside communicates with the second end side of the accommodation area 51e, and the second fluid pipe 54 (see FIG. 1) is connected to the second connecting part 513. That is, the second fluid pipe 54 is connected to the second end side of the accommodation area 51e via the second connecting part 513.

In this way, when in the upright position, the first connecting part 512 is formed vertically above the second connecting part 513. Meanwhile, when in the suspended position, the second connecting part 513 is situated vertically above the first connecting part 512.

The first porous body 7 is formed of a material based on ceramics or sintered metal as a raw material, or a material based on a high molecular material such as polyethylene resin as a raw material, and has a plurality of very small pores through which the hydraulic fluid permeates by capillary force.

The first porous body 7 is formed in a circular shape as viewed in a plan view and is accommodated in the accommodation area 51e, as shown in FIG. 3. The first porous body 7 is formed in such a way as to block one arcuate side of the accommodation area 51e and to be spaced away from the other arcuate side. The first porous body 7 is in contact with the inner surface 511f, is arranged spaced apart from the bottom surface of the grooves 511g, and is formed in such a way as to be movable in the first direction 51H within the accommodation area 51e. The first porous body 7 is formed in a circular shape as viewed in a plan view and therefore can rotate in the accommodation area 51e.

The first fluid pipe 53 and the second fluid pipe 54 are formed of a metal such as copper or stainless steel.

In the first fluid pipe 53, the gas gasified in the evaporating unit 51 circulates when in the upright position. In the second fluid pipe 54, the gas gasified in the evaporating unit 51 circulates when in the suspended position. The operation of the heat transport device 5 will be described later.

The condensing unit 52 liquefies the gas flowing in from the first fluid pipe 53 or the second fluid pipe 54 into the hydraulic fluid. The condensing unit 52 has a fluid pipe 521 through which the gas and the hydraulic fluid circulate, and a fin part 522 provided on the outside of the fluid pipe 521 (see FIG. 1 for these components). The fluid pipe 521 and the fin part 522 are formed of a metal material such as aluminum or copper.

The hydraulic fluid liquefied in the condensing unit 52 is carried to the evaporating unit 51, via the second fluid pipe 54 when in the upright position, and via the first fluid pipe 53 when in the suspended position.

Operation of Heat Transport Device

The operation of the heat transport device 5 will now be described.

Figure 4:
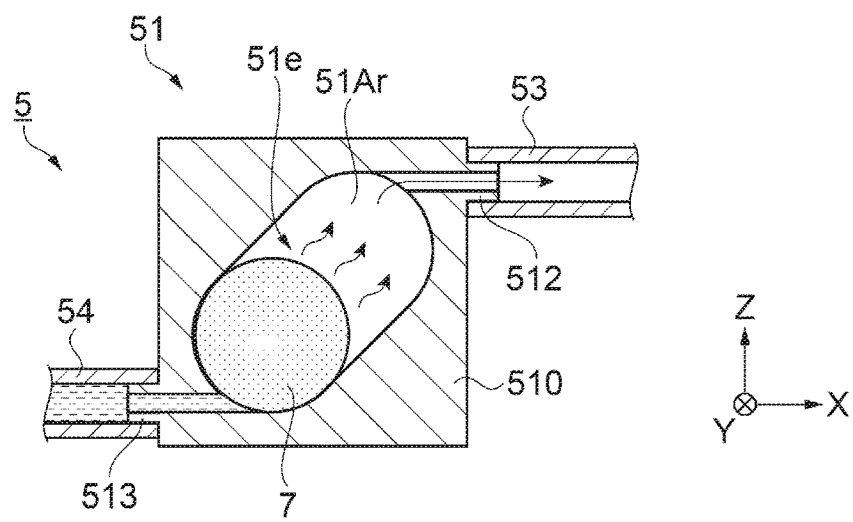
FIG. 4 is a schematic view for explaining the operation of a heat transport device in the first embodiment.
Figure 5:
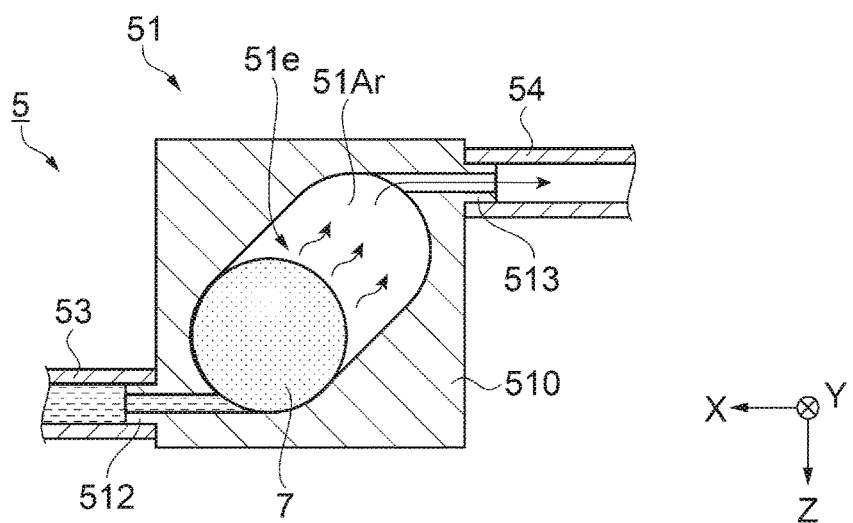
FIG. 5 is a schematic view for explaining the operation of a heat transport device in the first embodiment.

FIGS. 4 and 5 are schematic views for explaining the operation of the heat transport device 5. Specifically, FIG. 4 is a cross-sectional view showing the evaporating unit 51 and a part of the first fluid pipe 53 and the second fluid pipe 54 as viewed from the back side (−Y side) when in the upright position. FIG. 5 is a cross-sectional view showing the evaporating unit 51 and a part of the first fluid pipe 53 and the second fluid pipe 54 as viewed from the back side (−Y side) when in the suspended position. The grooves 511g (see FIG. 3) are omitted from the illustration in FIGS. 4 and 5.

As shown in FIG. 4, when in the upright position, the first porous body 7 is situated on the bottom side (−Z side), that is, on the side of the second fluid pipe 54, in the accommodation area 51e. The second connecting part 513 is filled with the hydraulic fluid. A space 51Ar is provided above (on the +Z side of) the first porous body 7 in the accommodation area 51e. The first porous body 7 is permeated with the hydraulic fluid by capillary force.

When the projector 1 is started up and the light source device 10 is driven, the heat generated by the light emission by the light emitting elements 12 is transmitted to the first porous body 7 via the base member 11 and the wall part 511a (see FIG. 2). Consequently, the hydraulic fluid permeating the first porous body 7 is heated and gasified. The gasified gas flows into the space 51Ar mainly through the grooves 511g (see FIG. 3) facing the first porous body 7. The gas flowing into the space 51Ar flows into the condensing unit 52 via the first fluid pipe 53, is cooled by the fin part 522 and the air blown from the blower fan 5F, and is liquefied into the hydraulic fluid.

The hydraulic fluid liquefied in the condensing unit 52 flows into the evaporating unit 51 through the second fluid pipe 54. That is, when in the upright position, the first fluid pipe 53 functions as a gas pipe through which the gas circulates, and the second fluid pipe 54 functions as a liquid pipe through which the hydraulic fluid circulates.

In this way, in the heat transport device 5, as the hydraulic fluid is gasified and liquefied while circulating through the annular flow path, heat is transported from the evaporating unit 51 to the condensing unit 52, and the light source device 10 connected to the evaporating unit 51 is thus cooled.

Meanwhile, when switched from the upright position to the suspended position, the first porous body 7 in the heat transport device 5 moves to the +Z side, that is, to the side of the first fluid pipe 53, in the accommodation area 51e, as shown in FIG. 5. Immediately after the position is switched from the upright position to the suspended position, the hydraulic fluid moves toward a position on the bottom side in the annular flowpath. At this point, the hydraulic fluid moves into the first connecting part 512 due to the gasification of the hydraulic fluid in the first porous body 7 caused by the driving of the light source device 10. Then, a space 51Ar is provided on the −Z side of the first porous body 7 in the accommodation area 51e. The first porous body 7 is permeated with the hydraulic fluid by capillary force.

When in the suspended position, the heat transport device 5 transports heat in the direction opposite to the direction described in the case of the upright position. That is, the gas gasified in the evaporating unit 51 due to the driving of the light source device 10 flows into the second fluid pipe 54 from the space 51Ar on the −Z side of the first porous body 7 in the accommodation area 51e, as shown in FIG. 5. The gas flowing into the second fluid pipe 54 is liquefied into the hydraulic fluid in the condensing unit 52 and flows into the evaporating unit 51 via the first fluid pipe 53. That is, when in the suspended position, the second fluid pipe 54 functions as a gas pipe through which the gas circulates, and the first fluid pipe 53 functions as a liquid pipe through which the hydraulic fluid circulates.

In this way, in the heat transport device 5, when in the suspended position, too, the hydraulic fluid is gasified and liquefied while circulating through the annular flow path. Thus, heat is transported from the evaporating unit 51 to the condensing unit 52, and the light source device 10 connected to the evaporating unit 51 is thus cooled.

As described above, this embodiment can achieve the following advantageous effects.

(1) The evaporating unit 51 is configured in such a way that the first porous body 7 can move in the first direction 51H in the accommodation area 51e. The first fluid pipe 53 and the second fluid pipe 54 are connected to the accommodation area 51e at the positions described above. Thus, it is possible to provide the heat transport device 5 which transfers the heat of the light source device 10 connected to the container 510 (wall part 511a) to the condensing unit 52 and thus cools the light source device 10, when in the upright position and when in the suspended position.

(2) In the heat transport device 5, the first porous body 7 moves along the inner surface 511f of the wall part 511a even if the position is switched from the upright position to the suspended position or from the suspended position to the upright position. Thus, the first porous body 7 can similarly receive via the wall part 511a the heat of the light source device 10 connected to the wall part 511a, when in the upright position and when in the suspended position. Therefore, in the heat transport device 5, when in the upright position and when in the suspended position, the hydraulic fluid permeating the first porous body 7 similarly evaporates and therefore it is possible to similarly transfer the heat of the light source device 10 to the condensing unit 52 and cool the light source device 10.

(3) On the inner surface 511f of the wall part 511a, the grooves 511g extending along the first direction 51H are formed. Thus, when in the upright position and when in the suspended position, the gas gasified by the evaporation of the hydraulic fluid permeating the first porous body 7 can easily pass through the area and therefore it is possible to efficiently transfer heat in the heat transport device 5.

(4) Since the light source device 10 is efficiently cooled by the heat transport device 5, the projector 1 can stably project a bright image over a long period, when in the upright position and when in the suspended position.

Second Embodiment

Hereinafter, a heat transport device according to a second embodiment will be described with reference to the drawings. In the description below, components similar to those in the first embodiment are denoted by the same reference signs and the detailed description of these components will be omitted or simplified.

The heat transport device in this embodiment has a first fluid pipe 81 and a second fluid pipe 82 which are different from the first fluid pipe 53 and the second fluid pipe 54 provided in the heat transport device 5 in the first embodiment.

Figure 6:
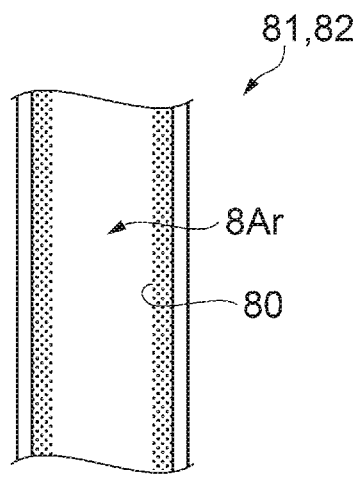
FIG. 6 is a cross-sectional view schematically showing a first fluid pipe and a second fluid pipe in a second embodiment.

FIG. 6 is a cross-sectional view schematically showing the first fluid pipe 81 and the second fluid pipe 82 in this embodiment.

The first fluid pipe 81 and the second fluid pipe 82 have a second porous body 80, as shown in FIG. 6. The second porous body 80 is provided on the inner surface of each of the first fluid pipe 81 and the second fluid pipe 82 and is provided in such a way that a space 8Ar through which the gas can pass is provided at an inner center of each of the first fluid pipe 81 and the second fluid pipe 82. The second porous body 80 has the function of being permeated with the hydraulic fluid by capillary force, with a lower density than the first porous body 7 in the first embodiment, that is, with larger pores than those of the first porous body 7. The second porous body 80 may be provided on the entire area or a part of the inner surface of each of the first fluid pipe 81 and the second fluid pipe 82.

Since the first fluid pipe 81 and the second fluid pipe 82 have the second porous body 80, the hydraulic fluid can be prevented from being left inside the pipes and thus blocking the inside of the pipes, for example, when the position is switched from the position of functioning as a liquid pipe to the position of functioning as a gas pipe.

Figure 7:
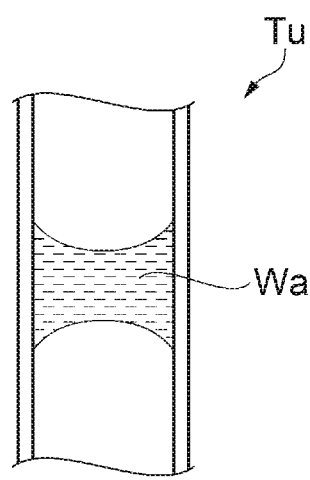
FIG. 7 is a comparative view for explaining the configuration of a second embodiment.

FIG. 7 is a comparative view for explaining the configuration in this embodiment and a cross-sectional view schematically showing a fluid pipe Tu without the second porous body 80.

In the fluid pipe Tu without a porous body, there is a risk that the hydraulic fluid may be left inside the pipe and block the inside by the surface tension of the hydraulic fluid as shown in FIG. 7 (the hydraulic fluid left inside is referred to as a "blocking fluid Wa"), when the position is switched from the position of functioning as a liquid pipe to the position of functioning as a gas pipe. If the blocking fluid Wa is generated inside the pipe functioning as a gas pipe, the gas gasified in the evaporating unit 51 is used to break this blocking fluid Wa open and therefore the start of the operation of the system for circulating heat transfer is delayed.

Meanwhile, the first fluid pipe 81 and the second fluid pipe 82 have the second porous body 80. Thus, even if the hydraulic fluid is left inside, the hydraulic fluid permeates the second porous body 80 by the capillary force of the second porous body 80. Therefore, the blocking fluid Wa is not generated and the space 8Ar in the center of the pipes is secured.

As described above, the heat transport device in this embodiment can achieve the following advantageous effects.

Even when the position is changed, the blocking fluid Wa is not generated and the space 8Ar in the center of the pipes is secured. Thus, it is possible to provide the heat transport device 5 that can quickly cool the light source device 10 even when switched from the upright position to the suspended position or when switched from the suspended position to the upright position.

Third Embodiment

Hereinafter, a heat transport device 9 according to a third embodiment will be described with reference to the drawings. In the description below, components similar to those in the first embodiment are denoted by the same reference signs and the detailed description of these components will be omitted or simplified.

The heat transport device 9 in this embodiment has an evaporating unit 91 which is different from the evaporating unit 51 provided in the heat transport device 5 in the first embodiment.

Figure 8:
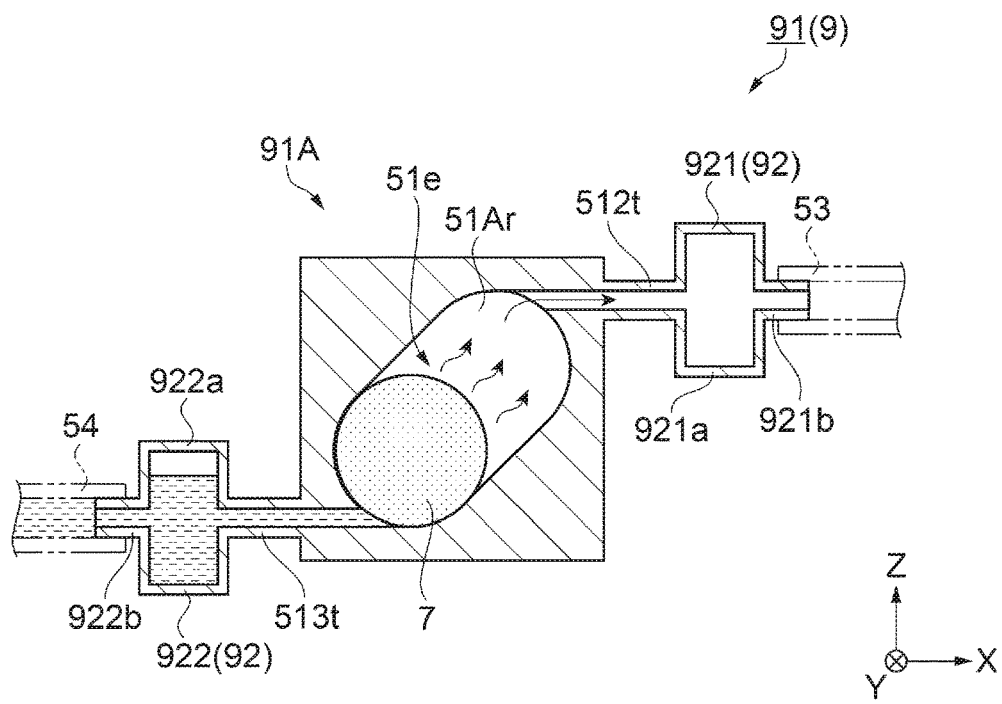
FIG. 8 is a cross-sectional view schematically showing an evaporating unit when the device is in an upright position in a third embodiment.

FIG. 8 is a cross-sectional view schematically showing the evaporating unit 91 when in the upright position, as viewed from the back side (−Y side).

The evaporating unit 91 has an evaporator main body 91A and tank units 92, as shown in FIG. 8.

The evaporator main body 91A is configured similarly to the evaporating unit 51 in the first embodiment and has tank connecting parts 512t, 513t of substantially the same shape as the first connecting part 512 and the second connecting part 513 (see FIG. 3) in the evaporating unit 51.

The tank units 92 include a first tank unit 921 connected to the tank connecting part 512t, and a second tank unit 922 connected to the tank connecting part 513t.

The first tank unit 921 has a tank main body 921a, and a first connecting part 921b to which the first fluid pipe 53 is connected, as shown in FIG. 8.

The tank main body 921a is provided between the tank connecting part 512t and the first connecting part 921b, protrudes up and down with respect to the tank connecting part 512t and the first connecting part 921b, and is formed in such a way as to be able to store the hydraulic fluid inside.

The second tank unit 922 has a tank main body 922a, and a second connecting part 922b to which second fluid pipe 54 is connected, as shown in FIG. 8.

The tank main body 922a is provided between the tank connecting part 513t and the second connecting part 922b, protrudes up and down with respect to the tank connecting part 513t and the second connecting part 922b, and is formed in such a way as to be able to store the hydraulic fluid inside.

In this way, the first tank unit 921 is arranged between the accommodation area 51e and the first fluid pipe 53, and the second tank unit 922 is arranged between the accommodation area 51e and the second fluid pipe 54. The first tank unit 921 is formed in such a way as to communicate with the top side (+Z side, first end side) of the accommodation area 51e, and the second tank unit 922 is formed in such a way as to communicate with the bottom side (−Z side, second end side) of the accommodation area 51e.

The heat transport device 9 transfers the heat of the light source device 10 connected to the evaporator main body 91A to the condensing unit 52 by heat transfer in a direction similar to the direction of heat transfer in the heat transport device 5 in the first embodiment.

Specifically, when in the upright position, the hydraulic fluid is stored in the second tank unit 922. Then, the gas gasified by the heat of the light source device 10 flows from the space 51Ar on the top side (+Z side) of the first porous body 7 to the condensing unit 52 via the first tank unit 921 and the first fluid pipe 53 (see FIG. 8), and is liquefied into the hydraulic fluid in the condensing unit 52. The hydraulic fluid liquefied in the condensing unit 52 flows into the evaporator main body 91A through the second fluid pipe 54 and the second tank unit 922. A part of the hydraulic fluid liquefied in the condensing unit 52 is stored in the second tank unit 922.

Meanwhile, though not illustrated, when in the suspended position, the hydraulic fluid is stored in the first tank unit 921. Then, the gas gasified by the heat of the light source device 10 flows from the space 51Ar on the −Z side of the first porous body 7 to the condensing unit 52 via the second tank unit 922 and the second fluid pipe 54, and is liquefied into the hydraulic fluid in the condensing unit 52. The hydraulic fluid liquefied in the condensing unit 52 flows into the evaporator main body 91A through the first fluid pipe 53 and the first tank unit 921. A part of the hydraulic fluid liquefied in the condensing unit 52 is stored in the first tank unit 921.

As described above, the heat transport device 9 in this embodiment can achieve the following advantageous effects.

Since the heat transport device 9 has the tank units 92, the hydraulic fluid contributing to heat transfer can be sealed in the flow path without strictly controlling the amount of the hydraulic fluid. Thus, the manufacturing of the heat transport device 9 can be simplified.

Even if the amount of the hydraulic fluid contributing to heat transfer in the heat transport device 9 is reduced, the hydraulic fluid is supplied from the second tank unit 922 when in the upright position and from the first tank unit 921 when in the suspended position. Therefore, it is possible to provide the heat transport device 9 which securely carries out heat transfer in the system when in the upright position and when in the suspended position.

The invention is not limited to the embodiments. Various changes, improvements and the like can be made to the embodiments. Modifications will be described below.

Modification 1

The evaporating unit 51 in the embodiments is configured in such a way that the first fluid pipe 53 and the second fluid pipe 54 are connected to the left and right sides of the evaporating unit 51. However, the first fluid pipe 53 and the second fluid pipe 54 may be connected at other positions, provided that the first fluid pipe 53 is connected to the first end side of the accommodation area 51e and that the second fluid pipe 54 is connected to the second end side of the accommodation area 51e.

Figure 9:
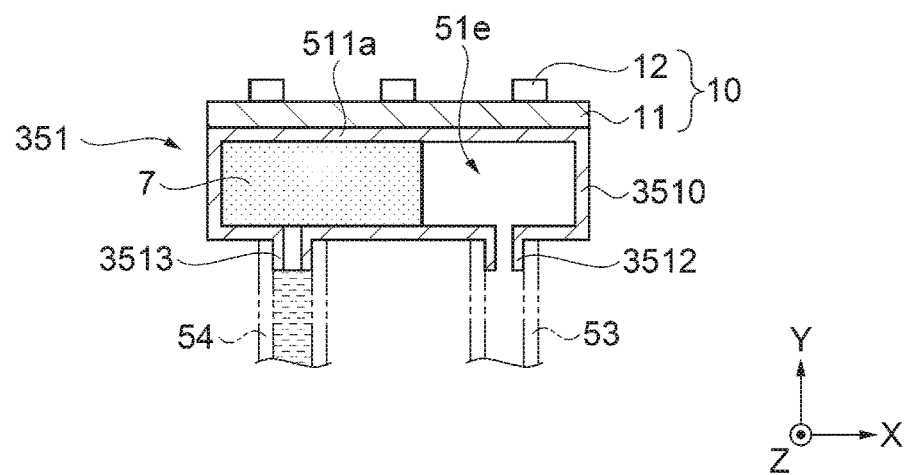
FIG. 9 is a cross-sectional view schematically showing an evaporating unit according to Modification 1.

FIG. 9 is a cross-sectional view schematically showing an evaporating unit 351 in this modification. As shown in FIG. 9, the evaporating unit 351 has a container 3510 as a heat receiving unit. In the container 3510, a first connecting part 3512 to which the first fluid pipe 53 is connected and a second connecting part 3513 to which the second fluid pipe 54 is connected are provided on the side opposite to the light source device 10. The first fluid pipe 53 and the second fluid pipe 54 are connected to the back side (−Y side) of the evaporating unit 351.

With the configuration in which the first fluid pipe 53 and the second fluid pipe 54 are thus connected to the side opposite to the light source device 10, it is possible to miniaturize the evaporating unit 51 in the left-right direction.

Modification 2

In the heat transport devices 5, 9 in the embodiments, the grooves 511g though which the gas resulting from the gasification of the hydraulic fluid permeating the first porous body 7 passes are provided in the container 510 (wall part 511a). However, the grooves through which the gas passes may be provided in the first porous body.

Figure 10:
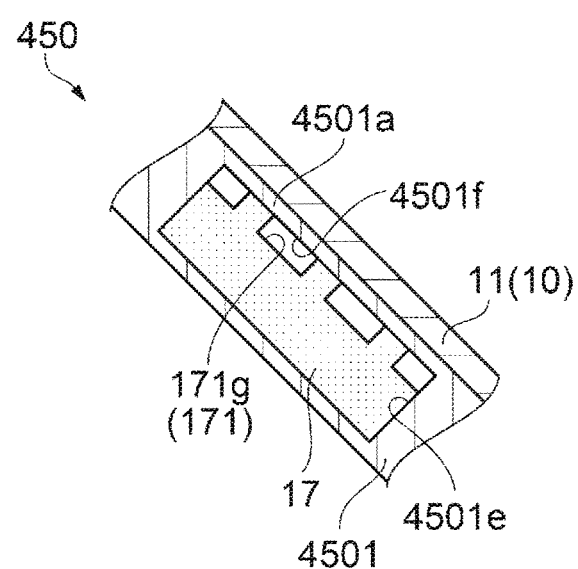
FIG. 10 is a schematic view showing an evaporating unit according to Modification 2.

FIG. 10 is a schematic view showing an evaporating unit 450 in this modification. FIG. 10 is the illustration as viewed from a direction along the first direction 51H.

As shown in FIG. 10, the evaporating unit 450 has a container 4501 as a heat receiving unit, and a first porous body 17 accommodated in the container 4501.

The container 4501 has a wall part 4501a connected to the base member 11 of the light source device 10. An accommodation area 4501e in the same shape as the accommodation area 51e in the embodiments as viewed in a plan view is provided inside the container 4501. An inner surface 4501f of the wall part 4501a is flatly formed, without having the grooves 511g (see FIG. 3).

The first porous body 17 is formed in the shape of a track as viewed in a plan view which has a smaller size in the longitudinal direction (first direction 51H, see FIG. 3) than the size of the track-shaped accommodation area 4501e. That is, the first porous body 17 is formed in such a way as to be able to move in the first direction 51H but not to rotate within the accommodation area 4501e. The first porous body 17 has an opposite part 171 which forms a side facing the inner surface 4501f of the wall part 4501a, shown in FIG. 10. In this opposite part 171, grooves 171g extending along the first direction 51H are formed.

With this configuration, the gas resulting from the evaporation and gasification of the hydraulic fluid permeating the first porous body 17 passes through the grooves 171g and flows into the first fluid pipe 53 or the second fluid pipe 54, as in the embodiments.

Modification 3

The first porous bodies 7, 17 are formed in a circular shape or in the shape of a track as viewed in a plan view. However, these shapes are not limiting. For example, the first porous bodies 7, 17 may be formed in a rectangular shape as viewed in a plan view or in a rectangular shape with its corners cut off as viewed in a plan view. The shape of the accommodation area corresponds to the shape of the first porous body.

Modification 4

The first direction 51H in the embodiments is a direction tilting with respect to the Z direction as viewed from the −Y side. However, the first direction may be a direction along the Z direction. That is, when in the upright position and when in the suspended position, the first direction may be a direction along the vertical direction.

Modification 5

The projector 1 in the embodiments uses the transmission-type liquid crystal light valves 400R, 400G, 400b as light modulation devices. However, the projector may use reflection-type liquid crystal light valves. The projector may use a micromirror-type light modulation device, for example, a DMD (digital micromirror device) or the like, as a light modulation device.

Modification 6

The light modulation device in the embodiments employs a so-called three-panel system using three light modulation devices corresponding to R light, G light, and B light. However, this is not limiting. A single-panel system may be employed. Alternatively, the invention can be applied to a projector having two, or four or more light modulation devices.

Modification 7

The projector 1 in the embodiments has the light source device 10 which emits blue light. However, the projector may have a light source device which emits light in other wavelength ranges, without being limited to blue light. Also, a heat transport device which transfers the heat of this light source device may be configured.

Modification 8

The optical unit 3 in the embodiments is configured in such a way that the direction of the light emitted from the light source device 10 and the direction of the light emitted from the projection device 600 are the same. However, an optical unit in which the direction of the light emitted from the light source device 10 and the direction of the light emitted from the projection device 600 are different from each other may be configured.

Modification 9

The heat transport devices 5, 9 in the embodiments are configured to cool the light source device 10. However, this technique can also be applied to a heat transport device which cools a heat generating member that is different from the light source device 10 (for example, a power supply device, or an optical component such as a light modulation device).

The entire disclosure of Japanese Patent Application No. 2016-255076, filed Dec. 28, 2016 is expressly incorporated by reference herein.

What is claimed is:

1. A heat transport device having a hydraulic fluid, the device comprising:
   an evaporating unit configured to receive heat from outside and gasify the hydraulic fluid into a gas;
   a condensing unit configured to liquefy the gas gasified in the evaporating unit into the hydraulic fluid; and
   a first fluid pipe and a second fluid pipe respectively connected to the evaporating unit and the condensing unit, the first and second fluid pipes forming an annular flow path with the evaporating unit and the condensing unit,
   wherein the evaporating unit includes a first porous body which is permeated with the hydraulic fluid by capillary force, and
a heat receiving unit configured to receive heat from outside, the heat receiving unit having an accommodation area where the first porous body moves in a first direction,
the first fluid pipe is connected to one end side in the first direction of the accommodation area, and
the second fluid pipe is connected to the other end side in the first direction of the accommodation area.

2. The heat transport device according to claim 1,
wherein the heat receiving unit has a wall part which forms the accommodation area, and
wherein the wall part has an inner surface which is in contact with the first porous body and along the first direction.

3. The heat transport device according to claim 2,
wherein the first porous body has an opposite part which forms a side facing the inner surface of the wall part, and
wherein a groove extending along the first direction is formed on at least one of the inner surface and the opposite part.

4. The heat transport device according to claim 1, wherein a second porous body which is permeated with the hydraulic fluid by capillary force is provided on an inner surface of the first fluid pipe and the second fluid pipe.

5. The heat transport device according to claim 1,
wherein the evaporating unit has a plurality of tank parts configured to store the hydraulic fluid,
wherein the plurality of tank parts includes a first tank part arranged between the accommodation area and the first fluid pipe and a second tank part arranged between the accommodation area and the second fluid pipe,
wherein the second tank part stores the hydraulic fluid when the heat transport device is in a first position where the one end side is vertically above the other end side, and
wherein the first tank part stores the hydraulic fluid when the heat transport device is in a second position where the other end side is vertically above the one end side.

6. The heat transport device according to claim 1, wherein the first porous body moves along the first direction according to a position of the heat transport device.

7. The heat transport device according to claim 1, wherein the first fluid pipe and the second fluid pipe are connected to the evaporating unit, shifted from each other in a vertical direction.

8. The heat transport device according to claim 1,
wherein the first fluid pipe is configured to circulate one of the gas and the hydraulic fluid,
wherein the second fluid pipe is configured to circulate the other of the gas and the hydraulic fluid, and
wherein the first fluid pipe and the second fluid pipe are connected to the evaporating unit in such a way that one fluid pipe through which the gas circulates, of the first fluid pipe and the second fluid pipe, is arranged vertically above the other fluid pipe through which the hydraulic fluid circulates.

9. The heat transport device according to claim 1,
wherein the first fluid pipe is configured to circulate one of the gas and the hydraulic fluid,
wherein the second fluid pipe is configured to circulate the other of the gas and the hydraulic fluid, and
wherein the hydraulic fluid and the gas are switched between the first fluid pipe and the second fluid pipe according to a position of the heat transport device.

10. A projector comprising:
a light source device;
a light modulation device configured to modulate light emitted from the light source device;
a projection device configured to project the light modulated by the light modulation device; and
the heat transport device according to claim 1.

11. A projector comprising:
a light source device;
a light modulation device configured to modulate light emitted from the light source device;
a projection device configured to project the light modulated by the light modulation device; and
the heat transport device according to claim 2.

12. A projector comprising:
a light source device;
a light modulation device configured to modulate light emitted from the light source device;
a projection device configured to project the light modulated by the light modulation device; and
the heat transport device according to claim 3.

13. A projector comprising:
a light source device;
a light modulation device configured to modulate light emitted from the light source device;
a projection device configured to project the light modulated by the light modulation device; and
the heat transport device according to claim 4.

14. A projector comprising:
a light source device;
a light modulation device configured to modulate light emitted from the light source device;
a projection device configured to project the light modulated by the light modulation device; and
the heat transport device according to claim 5.

15. A projector comprising:
a light source device;
a light modulation device configured to modulate light emitted from the light source device;
a projection device configured to project the light modulated by the light modulation device; and
the heat transport device according to claim 6.

16. A projector comprising:
a light source device;
a light modulation device configured to modulate light emitted from the light source device;
a projection device configured to project the light modulated by the light modulation device; and
the heat transport device according to claim 7.

17. A projector comprising:
a light source device;
a light modulation device configured to modulate light emitted from the light source device;
a projection device configured to project the light modulated by the light modulation device; and
the heat transport device according to claim 8.

18. A projector comprising:
a light source device;
a light modulation device configured to modulate light emitted from the light source device;
a projection device configured to project the light modulated by the light modulation device; and
the heat transport device according to claim 9.

* * * * *